US009284193B2

(12) United States Patent
Cruz-Silva et al.

(10) Patent No.: US 9,284,193 B2
(45) Date of Patent: Mar. 15, 2016

(54) METHOD FOR PREPARING GRAPHENE OXIDE FILMS AND FIBERS

(71) Applicants: The Penn State Research Foundation, University Park, PA (US); Shinshu University, Matsumoto, Nagano (JP)

(72) Inventors: Rodolfo Cruz-Silva, Nagano (JP); Aaron Morelos, Nagano (JP); Mauricio Terrones, State College, PA (US); Ana Laura Elias, State College, PA (US); Nestor Perea-Lopez, State College, PA (US); Morinobu Endo, Nagano (JP)

(73) Assignees: THE PENN STATE RESEARCH FOUNDATION, University Park, PA (US); SHINSHU UNIVERSITY, Nagano (JP)

( * ) Notice: Subject to any disclaimer, the term of this patent is extended or adjusted under 35 U.S.C. 154(b) by 0 days.

(21) Appl. No.: 14/519,937

(22) Filed: Oct. 21, 2014

(65) Prior Publication Data
US 2015/0111449 A1    Apr. 23, 2015

Related U.S. Application Data

(60) Provisional application No. 61/893,385, filed on Oct. 21, 2013.

(51) Int. Cl.
*C01B 31/04*    (2006.01)
*H01B 1/04*    (2006.01)
(Continued)

(52) U.S. Cl.
CPC .......... *C01B 31/043* (2013.01); *B01D 39/2055* (2013.01); *C09D 5/24* (2013.01); *H01B 1/04* (2013.01); *Y10T 428/2918* (2015.01);
(Continued)

(58) Field of Classification Search
CPC .......... C01B 31/043; C09D 5/24; H01B 1/04; B01D 39/2055; Y10T 428/31993; Y10T 428/2918; Y10T 428/31768; D01F 9/12
See application file for complete search history.

(56) References Cited

U.S. PATENT DOCUMENTS

2011/0227000 A1    9/2011    Ruoff et al.

FOREIGN PATENT DOCUMENTS

| CN | 101734654 | | 6/2010 |
|---|---|---|---|
| CN | 102249220 | | 11/2011 |
| CN | 102534868 | | 7/2012 |
| CN | 102534869 | | 7/2012 |
| CN | 102634869 A | * | 8/2012 |
| WO | 2011016889 A2 | | 2/2011 |
| WO | 2011134717 | | 11/2011 |
| WO | 2012124934 | | 9/2012 |

(Continued)

OTHER PUBLICATIONS

International Search Report for PCT/US2014/061589 filed Oct. 21, 2014.

*Primary Examiner* — Richard M Rump
(74) *Attorney, Agent, or Firm* — Buchanan Ingersoll & Rooney PC

(57) ABSTRACT

We report a method of preparation of highly elastic graphene oxide films, and their transformation into graphene oxide fibers and electrically conductive graphene fibers by spinning. Methods typically include: 1) oxidation of graphite to graphene oxide, 2) preparation of graphene oxide slurry with high solid contents and residues of sulfuric acid impurities. 3) preparation of large area films by bar-coating or dropcasting the graphene oxide dispersion and drying at low temperature. 4) spinning the graphene oxide film into a fiber, and 5) thermal or chemical reduction of the graphene oxide fiber into an electrically conductive graphene fiber. The resulting films and fiber have excellent mechanical properties, improved morphology as compared with current graphene oxide fibers, high electrical conductivity upon thermal reduction, and improved field emission properties.

7 Claims, 18 Drawing Sheets

The following conditions were used for SEM analysis as reflected in the attached pictures: Uncoated samples.
Accelerating voltage: 15 kV. Working distance 9.3 mm. Scale bar 100 mm.

(51) Int. Cl.
*C09D 5/24* (2006.01)
*B01D 39/20* (2006.01)

(52) U.S. Cl.
CPC .. *Y10T428/31678* (2015.04); *Y10T 428/31993* (2015.04); *Y10T 442/277* (2015.04); *Y10T 442/2861* (2015.04); *Y10T 442/2984* (2015.04)

(56) References Cited

FOREIGN PATENT DOCUMENTS

| | | |
|---|---|---|
| WO | 2013040636 | 3/2013 |
| WO | 2013040636 A1 | 3/2013 |

* cited by examiner

FIG. 1A    FIG. 1B    FIG. 1C
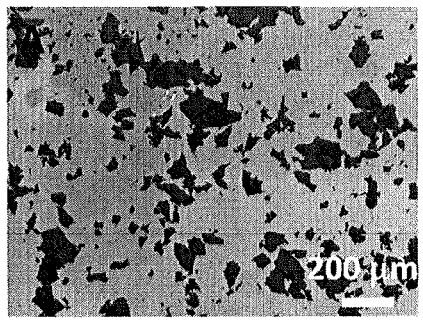 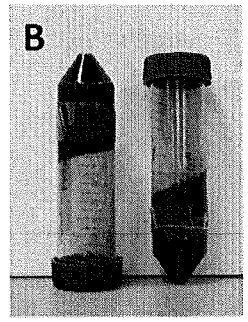 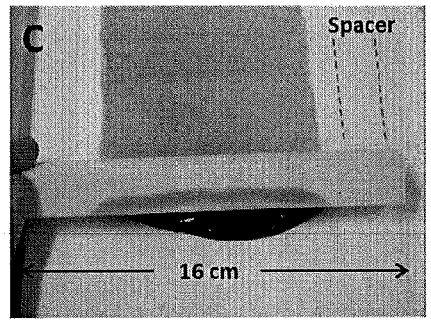
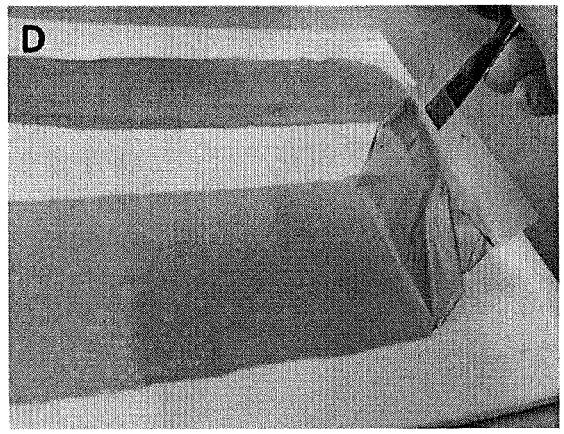 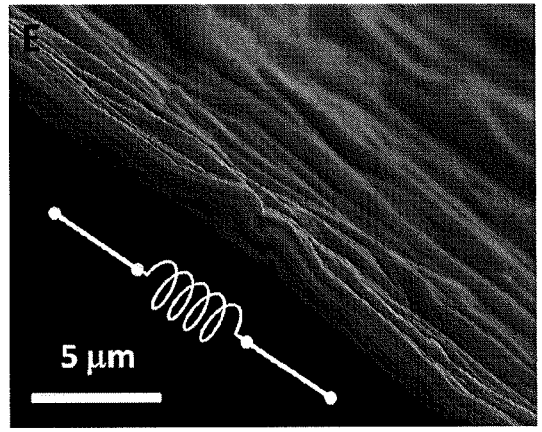
FIG. 1D    FIG. 1E
The following conditions were used for SEM analysis:
FIG. 1A: Uncoated samples drop casted on silicon. Accelerating voltage: 15 kV. Working distance 9.6 mm. Scale bar 200 µm.
FIG. 1E: Uncoated film. Accelerating voltage: 15 kV. Working distance 8.6 mm. Scale bar 5 µm.

The following conditions were used for SEM analysis as reflected in the attached pictures: Uncoated samples. Accelerating voltage: 15 kV. Working distance 9.3 mm. Scale bar 100 mm.

The following conditions were used for SEM analysis as reflected in the above image: Uncoated samples. Accelerating voltage: 15 kV. Working distance 10.7 mm. Scale bar 1 μm.

The following conditions were used for SEM analysis as reflected in the attached pictures: Uncoated samples.
Accelerating voltage: 15 kV. Working distance 9.8 mm. Scale bar 100 µm.

The following conditions were used for SEM analysis as reflected in the attached pictures: Uncoated samples. Accelerating voltage: 15 kV. Working distance 9.1 mm. Scale bar 10 μm.

The following conditions were used for SEM analysis as reflected in the attached pictures: Uncoated samples. Accelerating voltage: 15 kV. Working distance 8.9 mm. Scale bar 100 μm.

The following conditions were used for SEM analysis as reflected in the attached pictures: Uncoated samples. Accelerating voltage: 15 kV. Working distance 9.3 mm. Scale bar 100 µm.

The following conditions were used for SEM analysis as reflected in the attached pictures: Uncoated samples. Accelerating voltage: 15 kV. Working distance 8.7 mm. Scale bar 100 μm.

The following conditions were used for SEM analysis as reflected in the attached pictures: Uncoated samples. Accelerating voltage: 15 kV. Working distance 10.3 mm. Scale bar 1 mm.

The following conditions were used for SEM analysis as reflected in the attached pictures: Uncoated samples. Accelerating voltage: 15 kV. Working distance 9.2 mm. Scale bar 100 μm.

The following conditions were used for SEM analysis as reflected in the attached pictures: Uncoated samples. Accelerating voltage: 15 kV. Working distance 8.8 mm. Scale bar 100 μm.

The following conditions were used for SEM analysis as reflected in the attached pictures: Uncoated samples. Accelerating voltage: 15 kV. Working distance 9.5 mm. Scale bar 1 mm.

The following conditions were used for SEM analysis as reflected in the attached pictures: Uncoated samples. Accelerating voltage: 15 kV. Working distance 8.8 mm. Scale bar 100 μm.

The following conditions were used for SEM analysis as reflected in the attached pictures: Uncoated sample. Accelerating voltage: 1 kV. Working distance 11.8 mm. Scale bar 10 μm.

METHOD FOR PREPARING GRAPHENE OXIDE FILMS AND FIBERS

CROSS-REFERENCE TO RELATED APPLICATIONS SUGGESTIONS

This application claims priority to U.S. Provisional Patent Application No. 61/893,385, which was filed on Oct. 21, 2013. That application is incorporated by reference herein.

STATEMENT OF GOVERNMENT SPONSORSHIP

Not applicable.

BACKGROUND OF THE INVENTION

1. Field of the Invention

Embodiments relate to preparation of large area graphene oxide films and the conversion of these films into graphene oxide fibers and electrically conductive graphene fibers.

2. Background of the Related Art

Graphene has become an attractive material to prepare fibers of improved mechanical properties and specific electric conductivity. It has been found that because of its low density, graphene-based materials can have higher specific electrical conductivity than many metals. In addition, graphene has excellent mechanical properties, good thermal conductivity and can be obtained from reduction of graphene oxide ("GO"). This powder material, GO, has been known for more than 150 years since it was synthesized by Benjamin Brodie by using a mixture of potassium chlorate and fuming nitric acid (Brodie, B. C. (1859), "On the Atomic Weight of Graphite" *Philosophical Transactions of the Royal Society of London* 149: 249.).

Graphene oxide is a bulk precursor of the 2D material graphene, which is electrically conductive. Due to their lower weight, graphene based conductors can be useful in aeronautical conductors, and its greater chemical stability as compared to copper, makes this material attractive when environmental exposure cannot be avoided.

Free-standing pure graphene films have been made typically by filtration of aqueous graphene oxide dispersions (Dikin, et al., *Nature* 2007, 448-457) followed by chemical or thermal reduction. Unfortunately, the filtration process limits the production of these films to batch production and typically, only small area films (Area<100 $cm^2$) are obtained. These films are highly bi-axially oriented, resulting in great modulus and tensile resistance but low toughness. Due to the low toughness these films have a tendency to tear or break while folding or deformed by twisting, and have been barely used as structural materials.

Recently patent applications reporting preparation of pure graphene fibers by wet spinning have been filed (see, for example, "Method for preparing high-strength conductive graphene fiber by large-size graphene oxide sheet" CN102534869 A; "Graphene fiber and method for manufacturing same" WO2012124934 A3). Those applications report injecting an aqueous dispersion of graphene oxide through a spinneret into a coagulation bath. The change of phase causes the outer surface of the graphene fiber to coagulate, making a skin that provides mechanical stability to the wet spun fiber. These fibers later are dried and, sometimes, mechanically treated to improve their performance. However, during drying and coagulation, the formation of a skin with a large area results in an irregular cross sectional shape as the core of the fiber loses the solvent and decreases its volume.

In a different approach, the linear metallic substrates of graphene stripes prepared by chemical vapor deposition were chemically etched leaving a dispersion of graphene that were pulled from the liquid into a linear fiber ("Process for spinning graphene ribbon fibers" WO 2011134717 A1). However these methods rely on a liquid dispersion, which limits the process and adds complexity.

BRIEF SUMMARY OF THE INVENTION

Here we report a method to prepare super tough graphene oxide fibers with circular cross section, high toughness and elasticity, and excellent knottability due to its low self-abrasion. We first developed a method to produce homogeneous tough large area films that could be in some cases slightly corrugated after the bar-coating of the graphene oxide slurry. In some embodiments these films can reach up to 6% of strain with modulus as high as 5.7 GPa. With control of thickness films may reach as high as 10% of strain with modulus as high as 7.0 GPa, or more. Previously, films made by filtration (et al., Nature 2007, 448-457) shown typical elongation to break between 0.4-0.6% and modulus as high as 32 GPa. Our GO films are softer and have shown improved elasticity. This makes them considerably less prone to tear under manipulation, mainly due to their unique slightly corrugated morphology.

Colloidal dispersions can be classified either as "sol" or "gel" dispersions. Typical processes dealing with graphite oxide use graphite oxide "sol" dispersions, which are liquid, and which are sometimes are also called graphene oxide solutions. Instead of using a liquid dispersion, we use a "gel" dispersion, also referred to as a graphene oxide slurry. This type of dispersion has a semi-liquid or gel-like texture that, unlike graphene oxide "sol" dispersions, do not easily or freely-flow. These gel dispersions may be regarded as non-Newtonian fluids. This slurry may be obtained by increasing the concentration of graphene oxide sheets in a solvent to a point where they form a three-dimensional network. GO slurries therefore present different physical properties than GO liquid dispersions and so far, little attention has been paid on taking advantage of these properties while developing GO processing methods. In some embodiments the gel, when placed in the bottom of a 50 mL conical centrifuge tube and turned upside-down, does not flow.

Use of a graphene oxide slurry may provide substantial advantages. For example, the lack of flow of the gel allows the substance to be spread on a surface when deposited during bar coating. This lack of flow also allows the gel to be spread to a very thin layer without concerns of dewetting that would arise from use of a freely-flowing liquid dispersion.

To avoid adhesion of the thin films to the substrate, embodiments of our method may begin with use of a freshly polished PTFE casting plate (FIG. 1). Of course, unless stated in the claims a step such as polishing is not mandatory to the overall film creation process. Dewetting of the film did not occur due to the high viscosity of the aqueous slurry. The slurry is poured in the casting plate forming a thin film due to dry graphene oxide ("GO") sheets on top of the slurry within 1 hour of drying.

Drying can be accelerated by using forced convection, warm air and a controlled environment. Preferably the environment has less than 30% relative humidity ("RH"). We have found that controlled relative humidity is one significant element in making graphene oxide sheets as reported herein. After drying, the film is lifted of from the PTFE casting plate and left to equilibrate in an atmosphere with a RH between 30 and 70% of RH and preferably between 45% and 60% of RH at 20° C. Fibers are prepared by spinning GO films that have been cut into stripes.

In accordance with embodiments as presented herein, graphene fibers can be obtained by heat treatment or chemical reduction of the GO fiber. Composite fibers may also be obtained by modification of the GO sheets as indicated in the FIG. 2. To avoid untwisting of the fibers, a stress was applied by means of a weight during the heat treatment stage.

We have found that a significant element in achieving highly elastic graphite oxide films is the setting of the pH of the casting slurry. The role of pH in GO conformation was already studied by Cote et al. (Tunable assembly of graphene oxide surfactant sheets: wrinkles, overlaps and impacts on thin film properties, L. J. Cote et al. Soft Mater, 2010, 6, 6096-6101), and it was reported that graphite oxide sheets conformation are highly pH dependent. While neutral or alkaline pH results in flat sheets that stack easily, slightly crumpled morphologies are common in acidic media. We have surprisingly found that flat sheets may be produced in highly acidic conditions.

Embodiments include casting slurries with a pH between 2.5 to 3.0, in some embodiments between 2.0 to 4.0, and in some embodiments between 1.0 to 4.5 to achieve a preferred sheet conformation for thin free-standing films. Previously several authors have indicated that graphite and graphene oxide used for wet spinning was washed until pH becomes neutral (pH=7.0) while Jalili et al. indicated a pH of 5.0 (Jalili, R.; Aboutalebi, S. H.; Esrafilzadeh, D.; Shepherd, R. L.; Chen, J.; Aminorroaya-Yamini, S.; Konstantinov, K.; Minett, A. I.; Razal, J. M.; Wallace, G. G. Scalable One-Step Wet Spinning of Graphene Fibers and Yarns from Liquid Crystalline Dispersions of Graphene Oxide: Towards Multifunctional Textiles. Adv. Funct. Mater. 2013, 23, 5345-5354). Contrary to any prior teachings, embodiments herein recognize and provide that GO slurries with pH lower than 4.0, and preferably between 1.0 and 3.5, with optimal pH between 2.5 and 3.0, result in films with remarkable elastic properties suitable for dry spinning. This is believed to be a substantial departure from the prior art.

Although not wishing to be bound by theory, applicant believes that the sheet conformation and the presence of sulfuric acid as impurities behaves as plasticizer for the films in a two-way mechanism. The first is that the sulfuric acid is intercalated between the sheets of the GO, probably increasing the free-volume of the film. In addition, sulfuric acid is highly hydrophilic, so it increases the tendency of the film to adsorb water from the atmosphere. This water in turns acts as plasticizer, thus reducing the modulus of the film and increasing its toughness and spinnability as free-standing film. As will be discussed in more detail, other additives may also be useful in embodiments of the invention.

For example, embodiments of the invention may include plasticizers. Preferably water-soluble plasticizers may be used. For example, embodiments may include one or more polyethylenglycol monooleate 400 and 860, N-Butylbenzenesulfonamide and glycerol in concentrations below 1% with respect to graphene oxide.

Embodiments of the invention result in preparation of large area GO films by drop casting and drying at room temperature. Further, the resulting GO films can be manufactured into fibers by twisting and transformed into electrically conductive graphene films. The helical morphology of the resulting fibers provides these fibers with great elasticity, robust mechanical properties and high toughness. These fibers can be used as improved field emitters with low threshold voltage and good stability. In preferred embodiments GO films may be prepared by bar coating, which imparts orientation to the sheets, resulting in better mechanical properties of the resulting film.

In a further embodiment, the films can be coated with a second layer of material to form a hybrid system. The second layer could be composed of, for example, carbon nanotubes, graphene nanoplatelets, hexagonal boron-nitride, molybdenum disulfide nanosheets, tungsten disulfide nanosheets, polymer nanofibers, carbon fibers, silver nanowires and other metal dichalcogenides such as $MoSe_2$, $WSe_2$, $NbSe_2$, $NbS_2$, $ReS_2$, etc. This second material can be dispersed by an array of techniques such as atomization, electrospraying, bar coating, drop coating, using an aqueous or organic dispersion or slurry, rubbing or spray coating. This second layer forms a hybrid material which provides distinctive properties such as electrical or thermal conductivity, lubricity, optical properties, or mechanical reinforcement.

In another embodiment, the films can be reduced and rendered electrically conductive. Such fibers can reach high electrical conductivity (up to 400 Ω·cm) and be used in applications such as electron field emission. The layered structure of the film and the orientation of the sheets along the fiber axis, provides with several graphene edges that are active for field emission. The high electrical conductivity of the fibers allows higher current densities without excessive heat generation.

BRIEF DESCRIPTION OF THE DRAWINGS

FIG. 1A through FIG. 1E show different stages of a process to prepare graphene oxide film and convert it into film in accordance with the description of the present disclosure.

FIG. 4A shows a high magnification of the bilayer double-walled carbon nanotube ("DWCNT")/GO film, and FIG. 4B shows its corresponding fiber.

FIG. 5A shows the high magnification image of the fiber surface, where small $WS_2$ platelets can be observed, and FIG. 5B shows the low magnification image of the GO/$WS_2$ composite fiber prepared in accordance with an example of the present disclosure.

FIG. 7A shows the reduced fiber, where a large increment in the diameter can be observed and FIG. 7B shows a knot made with the reduced fiber, indicating that the fiber still keeps its robustness and can be handled.

FIG. 8A is 180° C.; FIG. 8B is 300° C.; FIG. 8C is 1050° C.; and FIG. 8D is by joule-heating.

FIG. 12A shows a conceptual diagram of a machine to continuously prepare textile or film supported graphene oxide film. This differs from FIG. 10 at least because that the GO slurry is bar coated over a textile support that is continuously loaded into the machine. Drying can be accelerated by forced convection using a ventilation system. FIG. 12B shows an example of a graphene oxide film coated onto a polyvinylidene fluoride nanofiber non-woven mat. FIG. 12C shows a high resolution SEM image of the graphene oxide film supported on the textile nanofiber support.

DETAILED DESCRIPTION OF THE INVENTION

Figure 2:
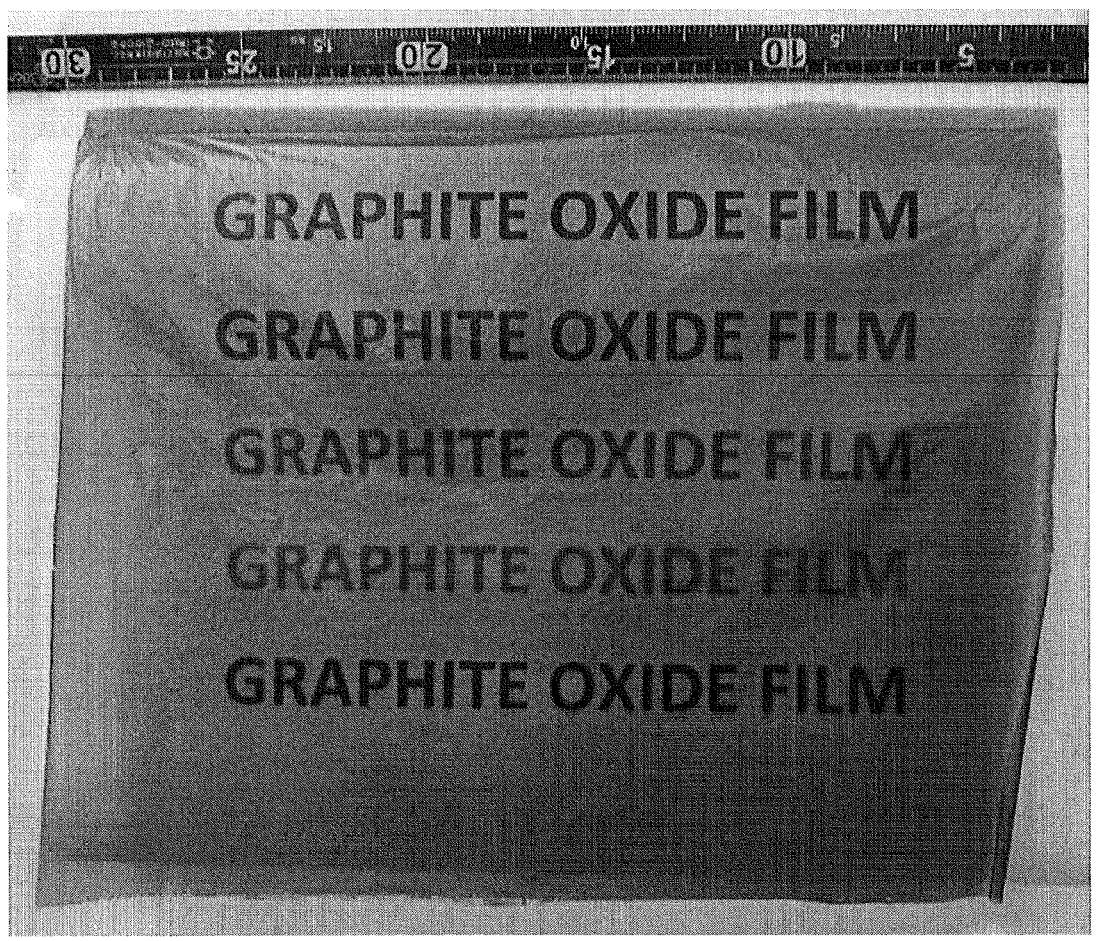
FIG. 2 is a picture of a large area graphene oxide film prepared in accordance with an example of the present disclosure.

Hereinafter, illustrative embodiments and examples will be described in detail so that inventive concepts may be readily implemented. However, it is to be noted that the present disclosure is not limited to the illustrative embodiments and examples but can be realized in various other ways. In drawings, parts irrelevant to the description are omitted for the simplicity of explanation, and like reference numerals denote like parts through the whole document. Through the whole document, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" are intended to have meanings close to numerical values or ranges specified with an allowable error.

Methods according to embodiments of the invention typically include the following steps: 1) oxidation of graphite to graphene oxide; 2) preparation of a graphene oxide slurry with high solid contents; 3) preparation of large area films by bar-coating or dropcasting the graphene oxide slurry and drying at low temperature. 4) spinning or scrolling the graphene oxide film into a fiber; and 5) thermal or chemical reduction of the graphene oxide fiber into an electrically conductive graphene fiber. Each of these steps will be explored in greater detail below. It should be noted that in many embodiments of the invention one or more of the steps may be performed by different actors; for example, in many embodiments of the invention the graphene oxide is provided to the artisan who is to prepare the slurry, rather than having the artisan be required to prepare the graphene oxide.

Typical embodiments begin with the oxidation of graphite to graphene oxide, or with the provision of graphene oxide for use in subsequent steps. Those of skill in the art will recognize that most graphite sources are suitable for oxidation. These include, for example, mineral or synthetic graphite flakes, highly oriented pyrolytic (HOPG) graphite, synthetic graphite, and kish graphite. Oxidation is typically accomplished by dispersing the graphite particles in a strong acid. Examples of suitable solvents include but are not limited to sulfuric acid and phosphoric acid and their mixtures. Suitable solvents can also include nitric acid, perchloric acid, trichloroacetic acid and dichloroacetic acid.

A strong oxidizing agent is then added and the solution is allowed to sit while oxidation takes place. Suitable oxidizing agents include but are not limited to potassium permanganate. It can also include sodium permanganate, ammonia permanganate, potassium chromate, sodium chromate, potassium persulfate, sodium persulfate, ammonia persulfate, potassium nitrate, ammonia nitrate, sodium nitrate, sodium chlorate, potassium chlorate, or ammonium chlorate.

Oxidation of the graphite results in functionalization of the graphite flakes and exfoliation into single graphene oxide sheets. After oxidation, the mixture is neutralized, typically with hydrogen peroxide, and the graphene oxide is separated from the neutralized medium.

Graphene oxide is then dispersed in a solvent. The solvent may be, for example, water, or mixtures of water containing a small amount (typically less than 1%) of sulfuric acid, phosphoric acid, hydrochloric acid, or nitric acid.

In some embodiments the graphene oxide is successively separated from a supernatant and subjected to a plurality of slurrying steps. In a preferred embodiment the solvent is water; this provides embodiments of the invention with an environmentally-friendly character. In some embodiments the solution specifically excludes alcohol, including methanol and ethanol, and also excludes acetone, N-dimethylformamide, or N-methylpyrrolidone.

In some embodiments the slurry is first conducted with an acid solvent and then later conducted with water as solvent. This continues until the graphene oxide is purified and remains in a slurry with pH between 2.5 to 3.0, in some embodiments between 2.0 to 4.0, and in some embodiments 1.0 to 4.5. In typical embodiments the slurry is between 0.80% to 1.0% solids, 0.85-0.95% solids, or 0.88 to 0.92% solids. The slurry may also be from 0.1 to 2.0% solids. The pH of the slurry can range from 1.0 to 5.0, but preferably between 2.0 and 4.0 and in the optimal conditions, between 2.5 and 3.00. As previously noted, these pH values vary considerably from prior practices that may have required washing until a neutral pH was reached.

Following creation of the slurry, the graphene oxide is used to form a film. This may be done by depositing the graphene oxide on a surface through dropcasting, or by bar coating. The surface is typically a non-stick surface. In some embodiments the surface is a low-friction surface, and may be, for example, polytetrafluoroethylene (PTFE) (including but not limited to TEFLON® brand polyfluoroethylene), fluorinated ethylene propylene copolymer (FEP), high density polyethylene (HDPE), perfluorinated alkoxy polymer resin (PFA), or fluorosilane treated glass surface. "Low friction surfaces" suitable for use in applications reported herein are typically those with a surface energy lower than 35 mN/m. These include most non-adherent materials. After deposit the slurry is dried to room temperature, which is typically between 20-30° C.

Films have a surface density, for example, between 0.1 mg/cm$^2$ to 1.5 mg/cm$^2$, or between 0.2 mg/cm$^2$ to 0.6 mg/cm$^2$.

Unlike GO films prepared by filtration, the modulus of the films are lower than 10 GPa and usually between 1 and 6 GPa, while the elongation to break between 2.50 and 6%. This is 1 order of magnitude higher than previously reported GO films (Dikin et al. Nature 2007, 448-457). The ultimate size of the sheets may be, for example, greater than 1000 µm$^2$. These sheets sometimes are called "Giant graphene oxide sheets" in the literature. Notably, typical embodiments do not require use of sieves or filtering, both of which would increase the cost and time needed to produce GO sheets. Some embodiments may particularly exclude sieves and filtering.

Figure 10:
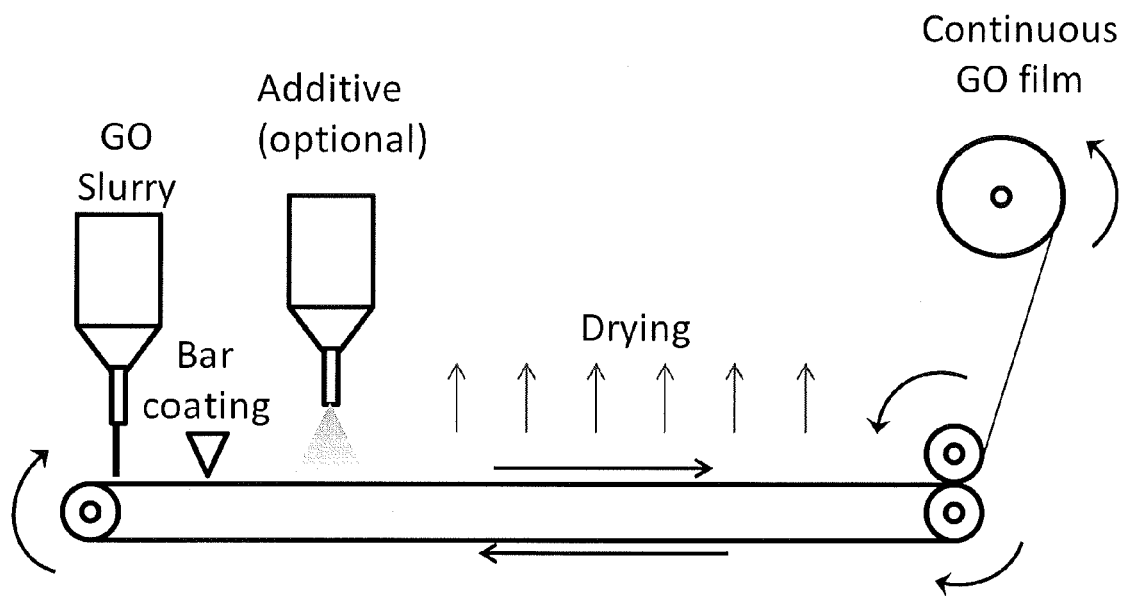
FIG. 10 is a conceptual scheme showing a machine for continuous production of graphene film in accordance with an embodiment of our method. As shown in the figure, a container is charged with the GO slurry and is distributed over the surface of a rolling and flexible PTFE film. A bar coating device is used to homogenize the thickness of the slurry as the band moves forward. In the case of bilayer films, a second distributor might spray a dispersion, either aqueous or organic, of a second nanomaterial. Then the film moves forward and the solvent is slowly evaporated. Finally, the dry film is pressed between two flat cylinders as shown at the right end of the device. These cylinders clamp the film so it can be drawn by a third cylinder that also collects the film. By adjusting the rotating speed of this last cylinder, a mechanical treatment such as stretching, can be imparted to the GO film. This entire procedure is carried out at temperatures near room temperature and at atmospheric pressure, in air.
Figure 12A:
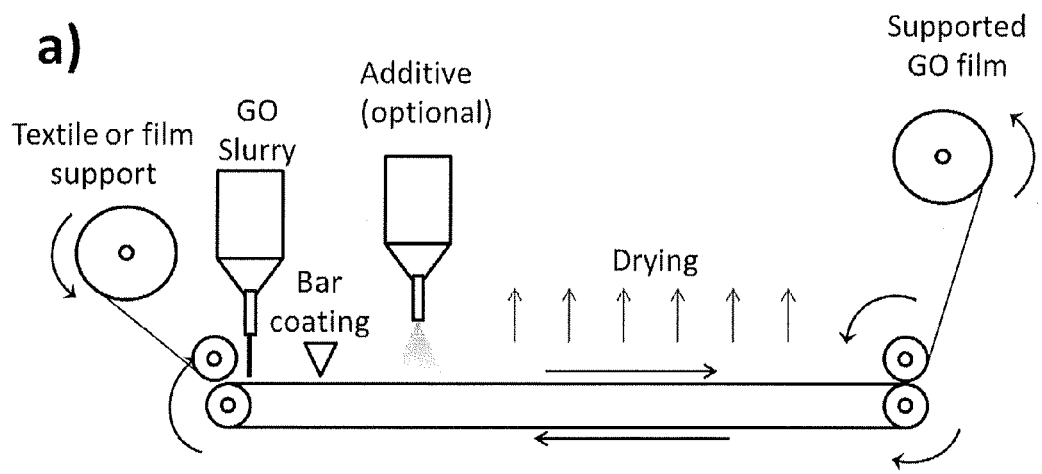
FIG. 12A, FIG. 12B, and FIG. 12C show a conceptual machine to continuously prepare textile or film supported graphene oxide film, as well as examples of such materials.
Figure 12B:
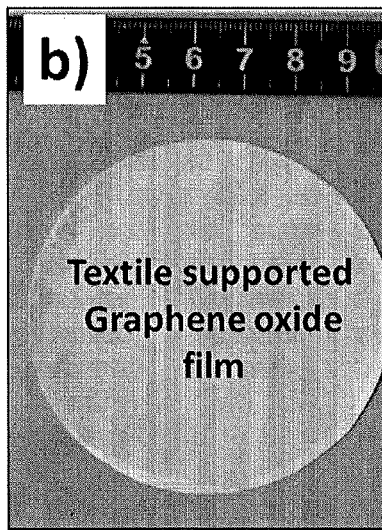
Figure 12C:
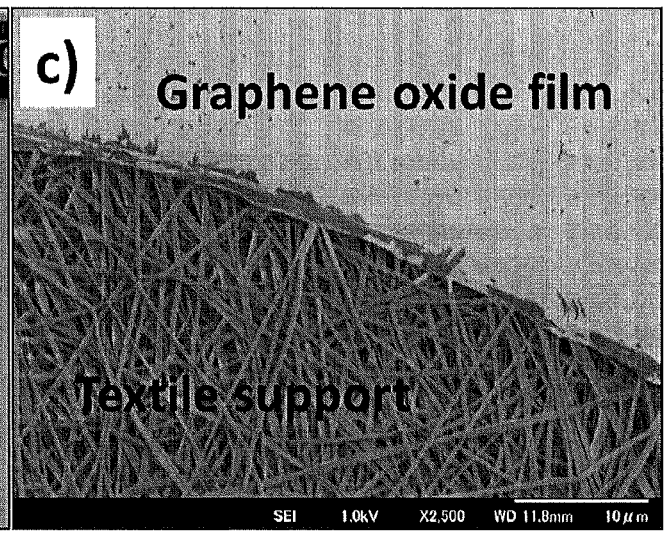

In some embodiments the film is made into a dual-layer film by application of a second layer of material. This may be, for example, but is not limited to double-walled carbon nanotubes (DWNT) or tungsten disulfide. It can include polymer nanofibers, graphite nanoplatelets, metallic nanowires, single walled carbon nanotubes, multiwalled carbon nanotubes, carbon fibers, and nitrogen doped carbon nanotubes. The second layer can be applied, for example, in the form of water dispersion (for example, when the second layer includes carbon nanotubes or silver nanowires), by rubbing against another solid (when the second layer includes graphite or tungsten sulfide) or by electrospraying or electrospinning (when the second layer includes polymer nanofibers). FIG. 10 and FIG. 12 show a potential application in spray form.

Although the film may be useful for some applications without further treatment, if threads are desired they may be produced by cutting the thin graphene oxide film into strips, then spinning it into a fiber. This may be followed by reduction of the threads. This may be done thermally and/or chemically. Thermal reduction may be conducted, for example, at temperatures between 180-3000° C. Joule heating may also be used for reduction. In certain embodiments heat may be applied for between 10 minutes to 24 hours depending on the temperature. In some embodiments the temperature starts at 180° C. and is raised in twenty degree increments to a final temperature of 300° C., over a period of 10-24 hours. When joule heating is used, it is typically conducted under inert or reducing atmosphere in which the conductivity reached ranges from 0.0001 Ω·cm to 400 Ω·cm Chemical reduction may be conducted by placing the threads in a reducing atmosphere for a sufficient time to accomplish the desired reduction, which is typically measured by achievement of a desired conductivity. For example, in some embodiments hydrazine is used as the chemical reducing agent. In some cases the threads are weighted to prevent undesirable shaping such as curling or untwisting during the reduction.

In some embodiments the films is deposited onto a polymer film or a textile support to prepare a supported graphene oxide film. The film can be further reduced by chemical or thermal methods. The textile support can include paper, polymer fiber non-woven mat, cellulose nanofiber paper, non-woven mats of carbon nanotube based paper, or carbon fiber. The film support might include metallic foil or polymer film. These support films improve handling of the thin films. Typical applications of film supported on graphene oxide film can include gas barrier properties. Typical applications of textile supported graphene oxide films are water purification and gas separation technologies.

EXAMPLE 1

Preparation of a GO Slurry

Embodiments as related herein may be better understood with reference to an illustrative embodiment of the invention, as presented below. The oxidation of graphite may include, but is not limited to, large flake graphite as raw source of graphite, sulfuric acid as solvent, and a strong oxidizing agent. In addition, a second acid can be added following the procedure reported by Marcano et al. (Improved synthesis of graphene oxide. ACS Nano, 2010, 4 (8), pp 4806) to improve the quality of the resulting graphene oxide.

In an illustrative embodiment, 5 g of graphene were dispersed with magnetic stirring in a mixture of 200 mL of $H_2SO_4$ and 40 mL of $H_3PO_4$. Then 25 g of potassium permanganate were slowly added and dissolved resulting in a green mixture. (Caution: permanganic acid should be handled carefully avoiding mixing with organic solvents or heating above 55° C. at any time). A thermometer was introduced to carefully monitor the temperature.

The hotplate was magnetically stirred and the temperature of the mixture reached ca. 40° C. After one hour of oxidation, the graphene exfoliated. The mixture became a thick slurry, and magnetic stirring was interrupted. A Teflon® rod was used from this point to mix the slurry every 5 to 10 minutes. After 3.5 h of oxidation the dark brown mixture was allowed to reach room temperature and then poured slowly in a mixture of 600 mL of cold water with 40 mL of 35% $H_2O_2$. This stage is accompanied by heating and vigorous bubbling. Finally, the GO bright yellow slurry was left overnight to allow for complete neutralization of potassium permanganate.

The supernatant of the yellow GO slurry was decanted, and the solid GO cake was dispersed in 1 L of $H_2SO_4$ 5% wt. During purification of GO, to preserve the large sheet size, magnetic stirring was avoided. Instead, a roller mixer was used. After re-constitution the GO slurry was centrifuged at 4,000 rpm for 5 minutes, and the supernatant decanted. This step was repeated three times, but instead of acid, distilled water was used. While the acid is washed, the GO expands, and the third time the GO pellet is washed it shows a two layer structure. The bottom layer consists of larger unexfoliated particles of GO, and a top layer is a soft jelly-like slurry that consists mainly of exfoliated graphene oxide sheets. This layer was collected with a spatula, and dispersed in a large amount of water (4 L). Large unexfoliated particles that might be still present were removed by centrifugation at 4,000 rpm for 3 min. The GO was washed by centrifugation, but from this point on, there is no solid pellet, instead, the GO slurry separates into a brown slurry at the bottom of the vial and a clear supernatant that can be decanted. Finally it was concentrated into a slurry with pH 3.0-3.5 and 0.9% of solids by centrifugation at 6,000 rpm for 3 h.

EXAMPLE 2

Preparation of Large-Area Graphene Oxide Film on PTFE Surface

A polytetrafluoroethylene (PTFE) surface was polished with silicon carbide polishing paper (2000 grit) until a smooth surface was achieved. Then, parallel spacers of 120 µm thickness, made by adhesive tape, were deposited, leaving a casting area between them of about 14 cm×30 cm. Then, a graphene oxide slurry (ca. 0.88 wt %) was deposited between the spacers. A Teflon® bar of 120 µm thickness was used to spread this slurry onto the PTFE surface. The GO was dried at room temperature under a moderate air flow at low R.H. (<30% R.H.). After 12 h the GO film was peeled off from the substrate, resulting in a free standing film with 0.2 mg/cm$^2$ surface density. This procedure can be observed step by step in FIG. 1A through FIG. 1E.

EXAMPLE 3

Preparation of Large Area Graphene Oxide Fiber

A polytetrafluoroethylene (PTFE) surface was polished with silicon carbide polishing paper (2000 grit) until a smooth surface was achieved. Then, parallel spacers of 480 μm thickness, made by adhesive tape, were deposited leaving a casting area between them of about 28 cm×28 cm. Then, a graphene oxide slurry (ca. 0.88 wt %) was deposited between the spacers and a teflon bar was used to spread this slurry onto the PTFE surface. The GO was dried at room temperature under a moderate air flow at low R.H. (<30 R.H.). After 12 h the GO film was peeled off from the substrate resulting in a free standing film with 0.6 mg/cm$^2$ surface density. This procedure can be observed step by step in FIG. 2.

Figure 3:
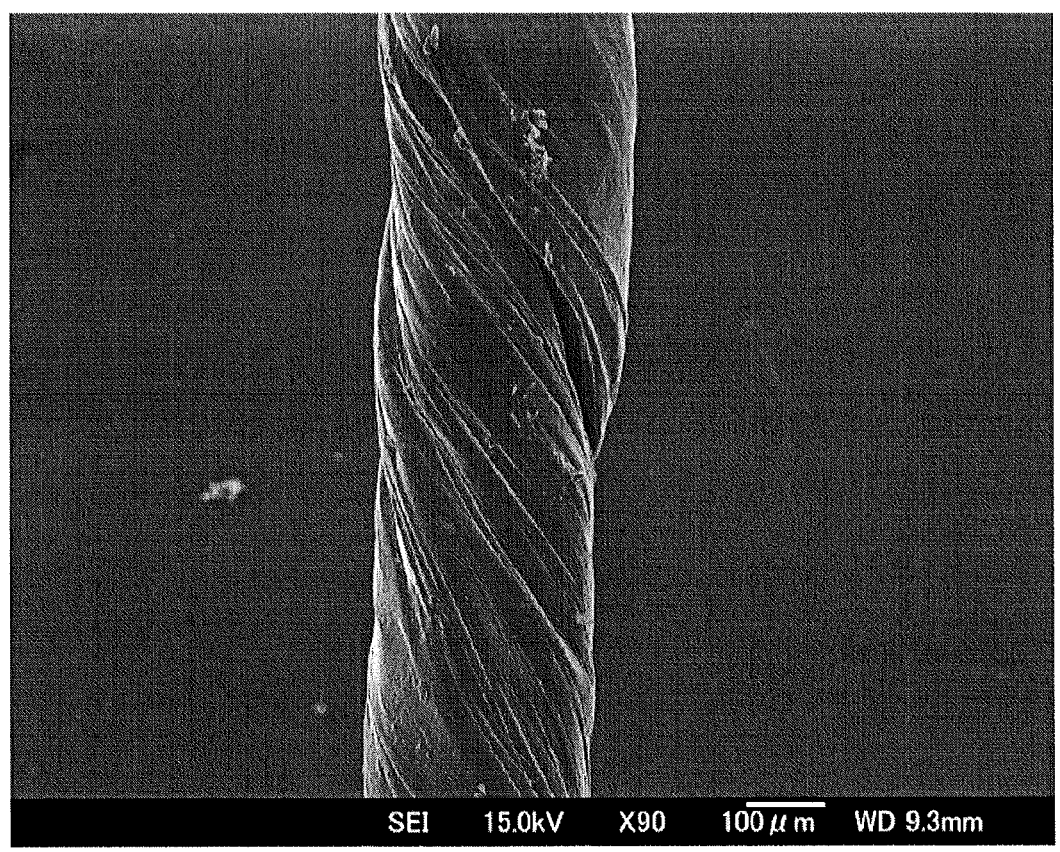
FIG. 3 is an electron micrograph of a graphene oxide fiber prepared in accordance with an example of the present disclosure.

A free standing graphene oxide film of ca. 0.6 mg/cm$^2$ was cut into a strip of about 20 cm length×1 cm wide. The left end of the GO strip was attached to a fixed position while the right end was attached to a rotor. The fiber was spun mechanically into a fiber of about 280 μm diameter and 14 cm in length, with a linear density of about 0.85 mg/cm and a volumetric density of about 1.4 g/cm$^3$, as shown in FIG. 3.

EXAMPLE 4

Figure 4A:
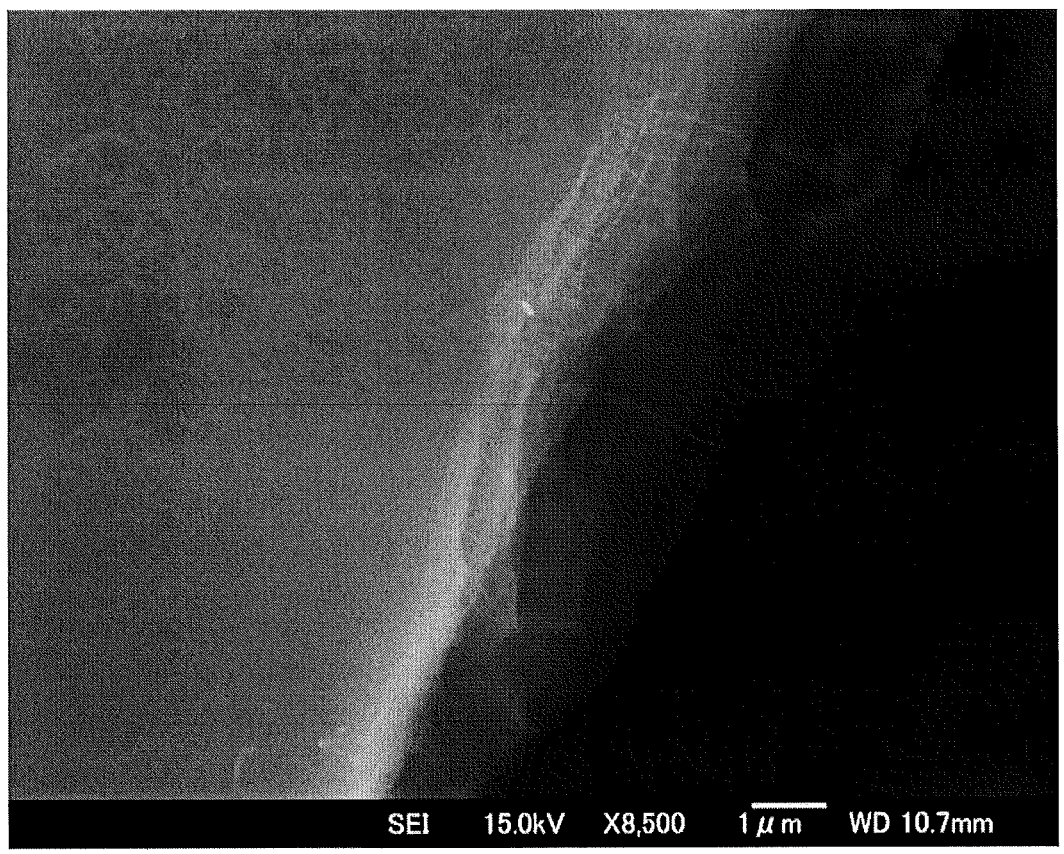
FIG. 4A and FIG. 4B are an SEM picture of a graphene oxide/double walled carbon nanotubes composite fiber prepared in accordance with an example of the present disclosure.
Figure 4B:
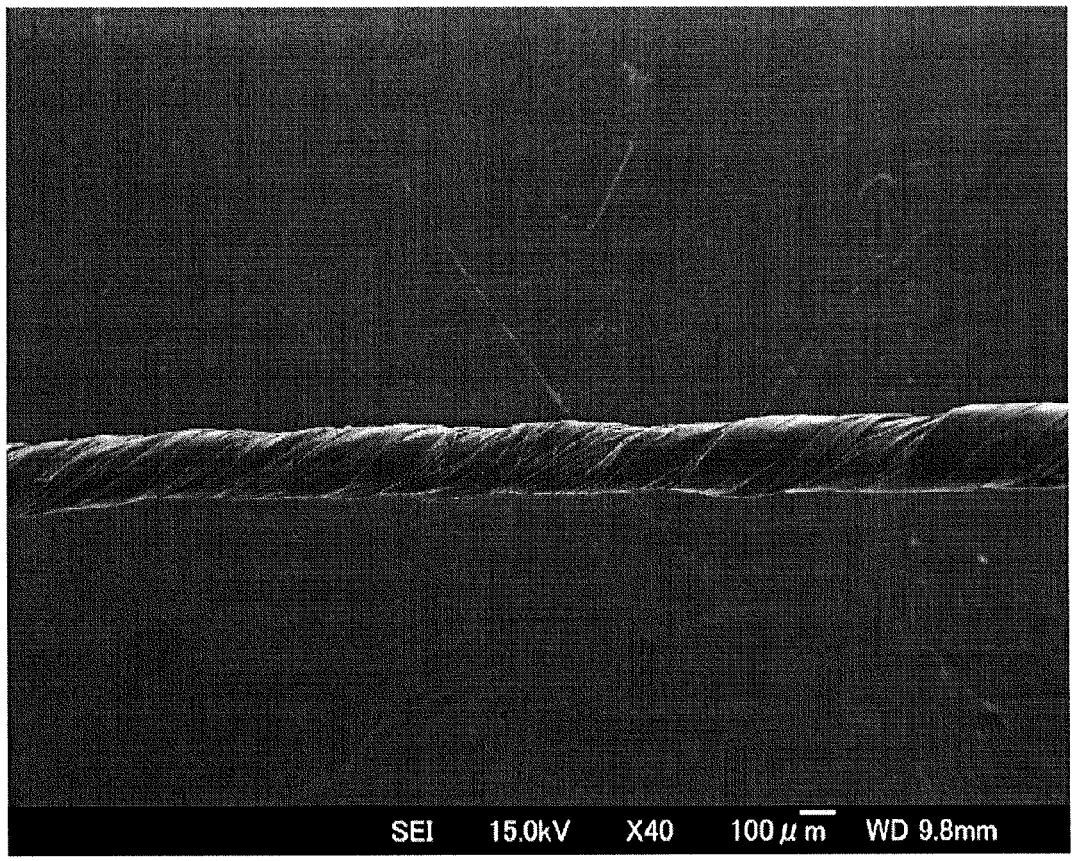
Figure 5A:
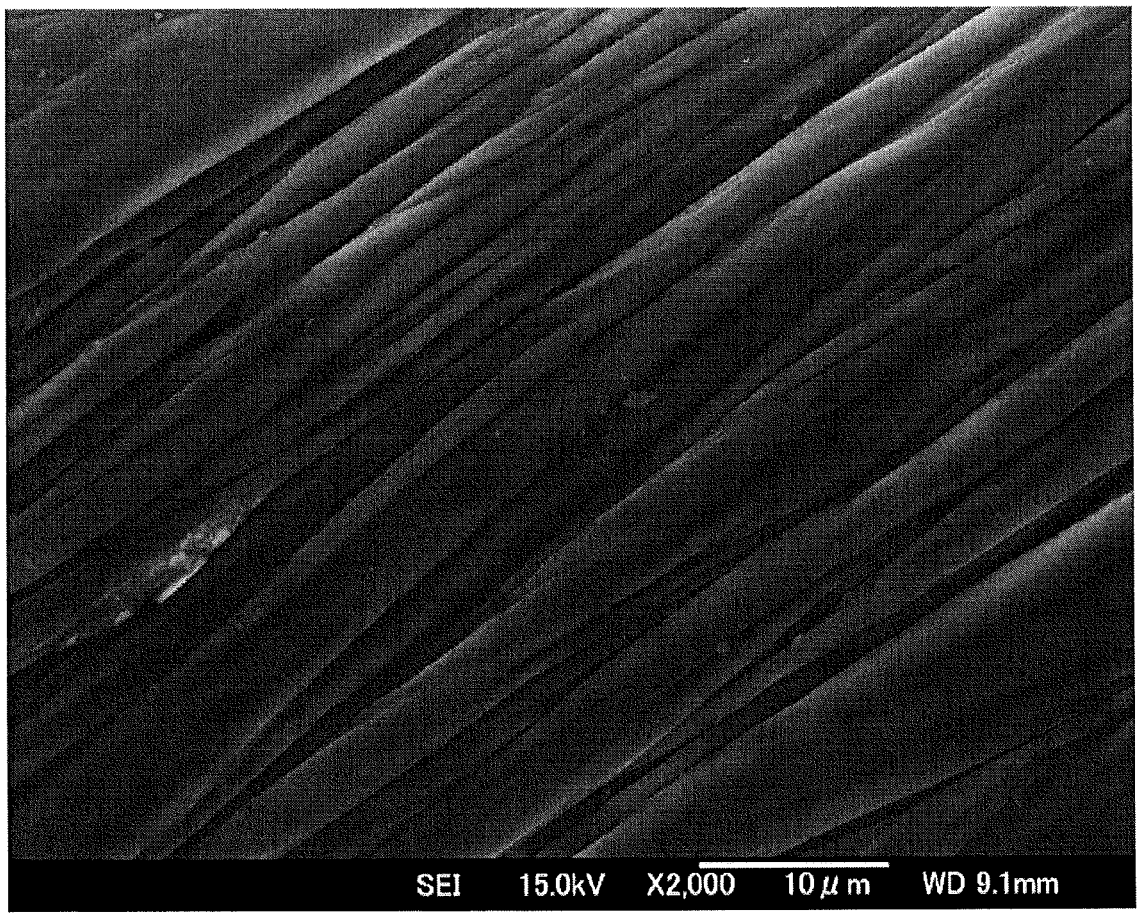
FIG. 5A and FIG. 5B are an SEM picture of a graphene oxide/tungsten disulfide ($WS_2$) composite fiber.
Figure 5B:
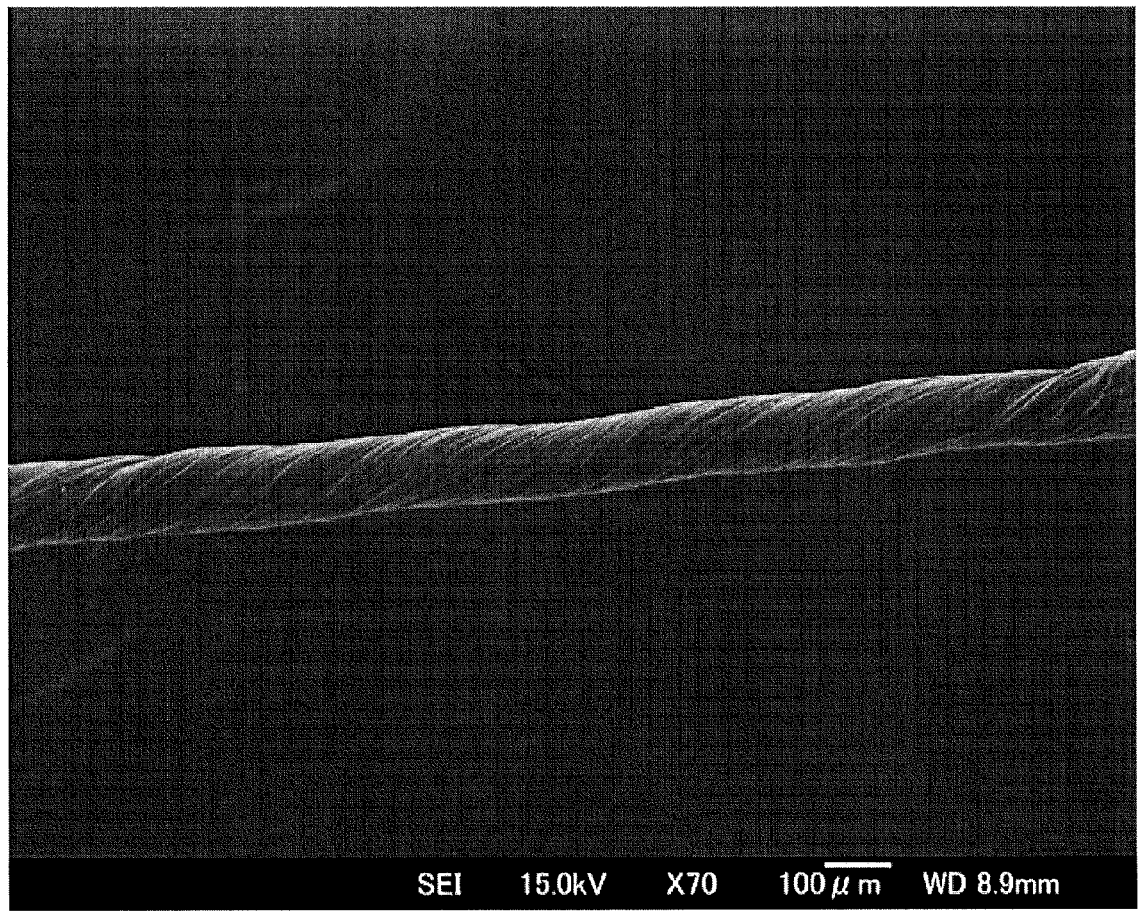

Preparation of Graphene Oxide/Double Walled Nanotube Bilayer Film and Composite Fiber A film with density of ca. 0.6 mg/cm$^2$ was prepared on a PTFE surface and dried according to Example 2. Then, approximately 10 mL of a polyelectrolyte stabilized double-walled nanotube ("DWNT") slurry (0.05 mg/mL) was spread over an area of ca. 100 cm$^2$ and dried at room temperature, forming a bilayer graphene oxide/double walled nanotube bilayer film, After 12 hours the GO/DWNT film was peeled from the surface and cut into strips of approximately 0.8 cm width. The strips were manually spun into fibers of approximately 200 μm in diameter, as shown in FIG. 4.

EXAMPLE 5

Preparation of a Graphene Oxide/Tungsten Disulfide Bilayer Film and Composite Fiber A film with density of ca. 0.6 mg/cm$^2$ was prepared on a PTFE surface and dried according to Example 2. Then, before peeling from the PTFE surface, the GO film was rubbed with tungsten disulfide powder using a natural rubber pad. This results in delamination of the WS$_2$ material, coating uniformly the surface of the GO film. The film was peeled off, resulting in a bilayer GO/WS$_2$ film. Then a composite strip of GO/WS$_2$ of about 0.5 cm wide was manually spun into a fiber of about 100 μm in diameter.

EXAMPLE 6

Preparation of a Two-Ply Homochiral Yarn of Graphene Oxide Fiber

Figure 6:
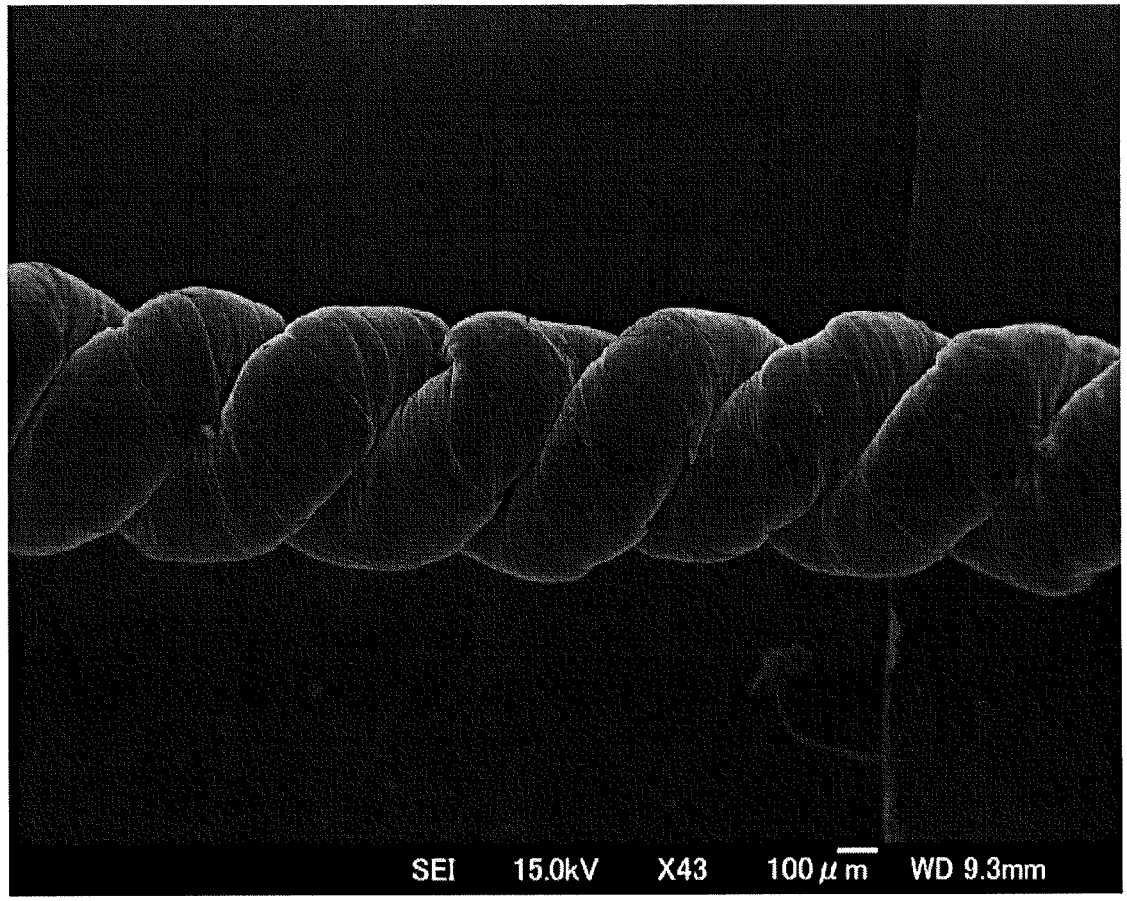
FIG. 6 is a SEM picture of a homochiral two-ply graphene oxide yarn, prepared in accordance with an example of the present disclosure.

Two fibers of about 1.4 mg/cm in lineal density and 400 μm of diameter were prepared using a procedure similar to the one reported in Example 2. These fibers were aligned parallel and then manually twisted resulting in a two-ply homochiral yarn such as that shown in FIG. 6.

EXAMPLE 7

Reduction of Graphene Oxide Fiber by Hydrazine

Figure 7A:
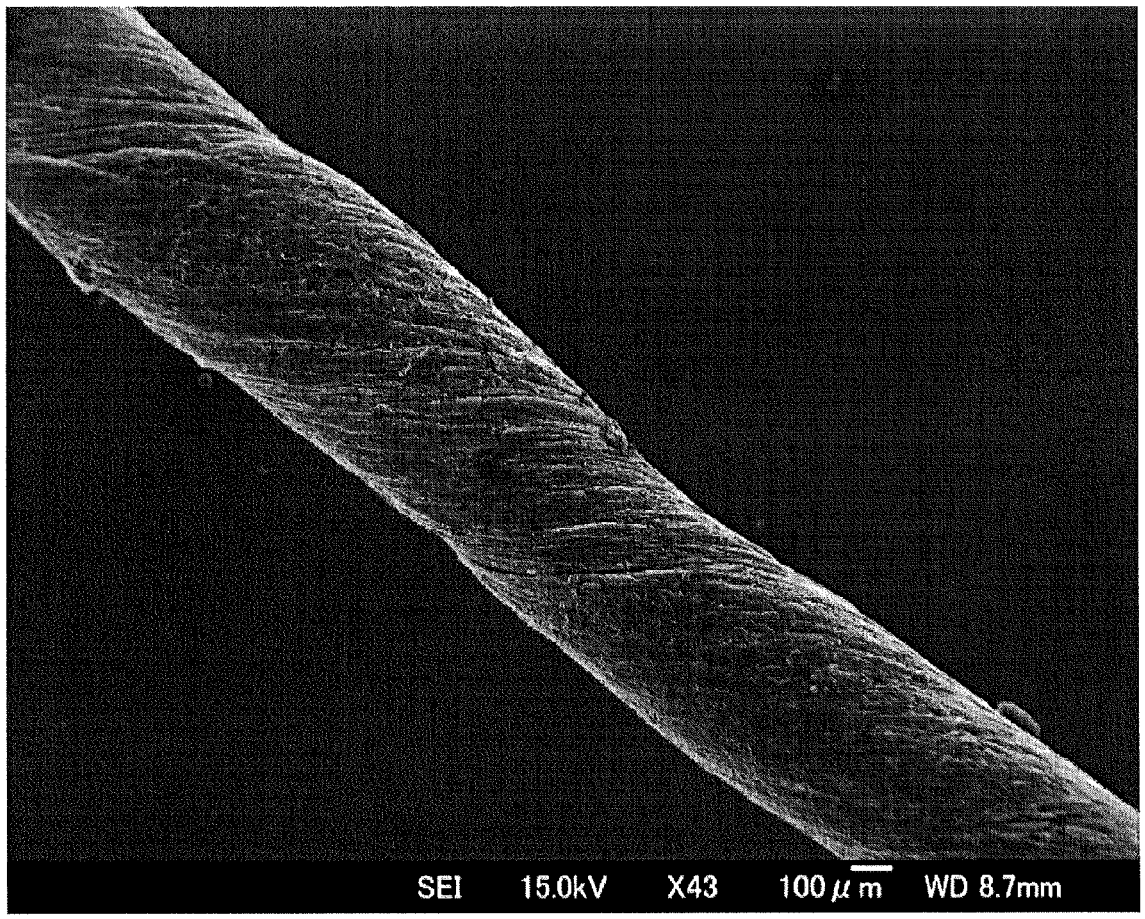
FIG. 7A and FIG. 7B are SEM pictures of a graphene oxide fiber reduced with hydrazine in vapor in accordance with an example of the present disclosure.
Figure 7B:
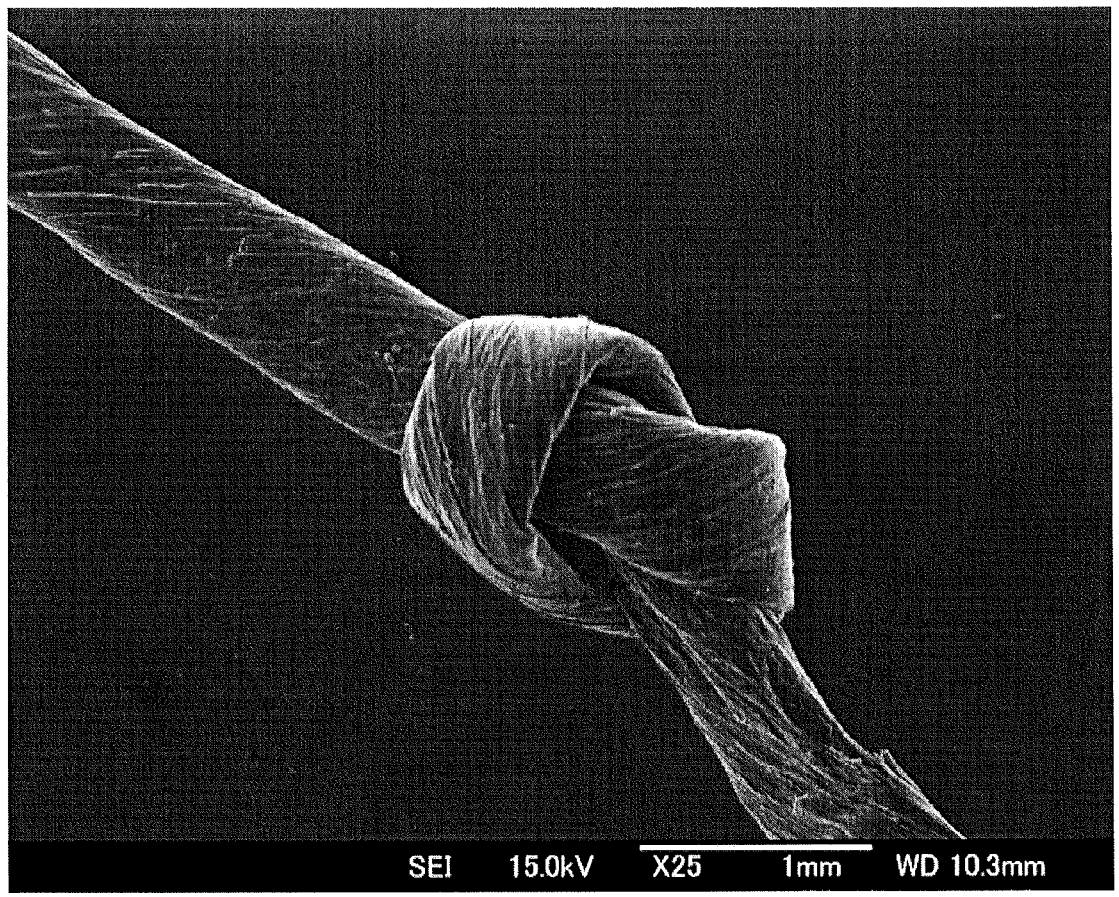

A graphene oxide fiber was prepared following a similar procedure as the indicated in Example 3. The resulting fiber of about 300 μm in diameter was hung inside a 1 L glass beaker using adhesive tape in one end, and a 4.7 g weight on the other. The beaker was closed with mylar and then 500 μL of hydrazine solution (65 wt %) were injected. The beaker was left overnight at 80° C. Then, the beaker was opened and the fiber was dried in the oven 2 hours ("h") at 80° C. to eliminate any residual hydrazine. The process caused the fiber to enlarge its diameter and to become dark black. An image of the resulting fiber can be seen in FIG. 7.

EXAMPLE 8

Thermal Reduction of Graphene Oxide

Figure 8A:
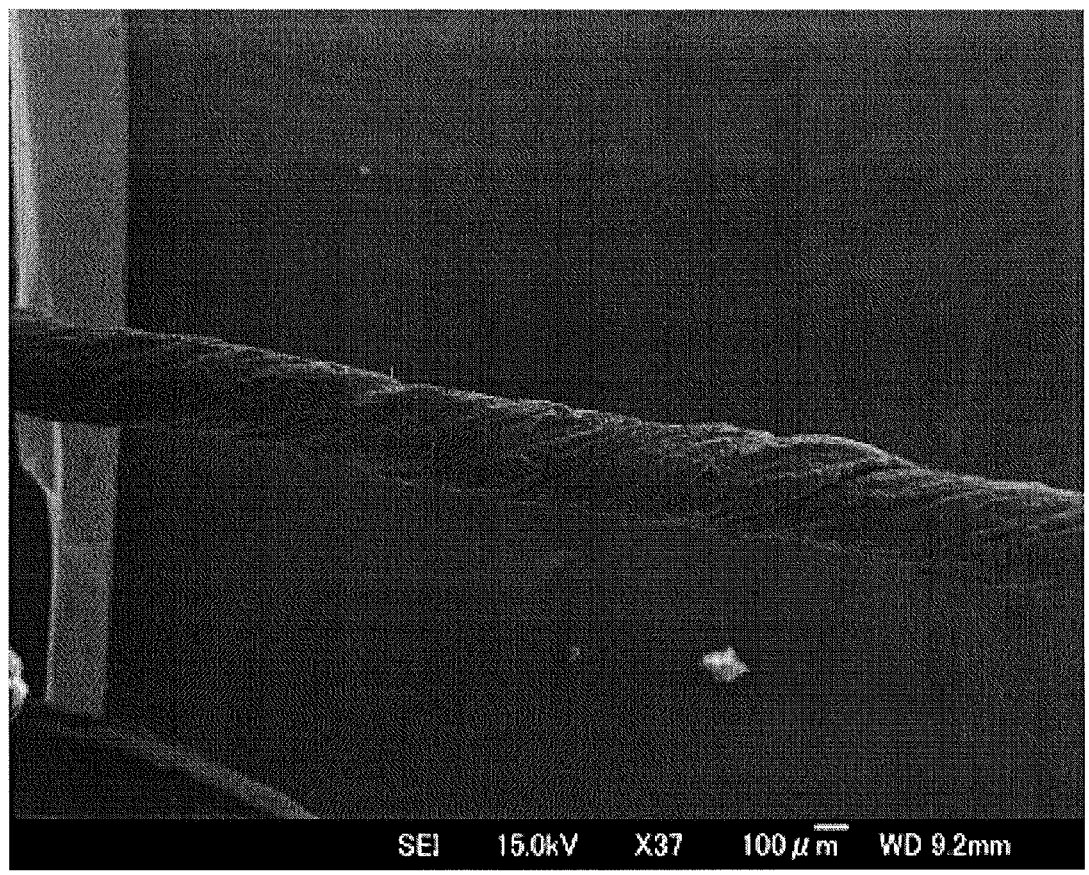
FIG. 8A, FIG. 8B, FIG. 8C, and FIG. 8D are SEM pictures of a graphene oxide fiber reduced with different temperature treatments.
Figure 8B:
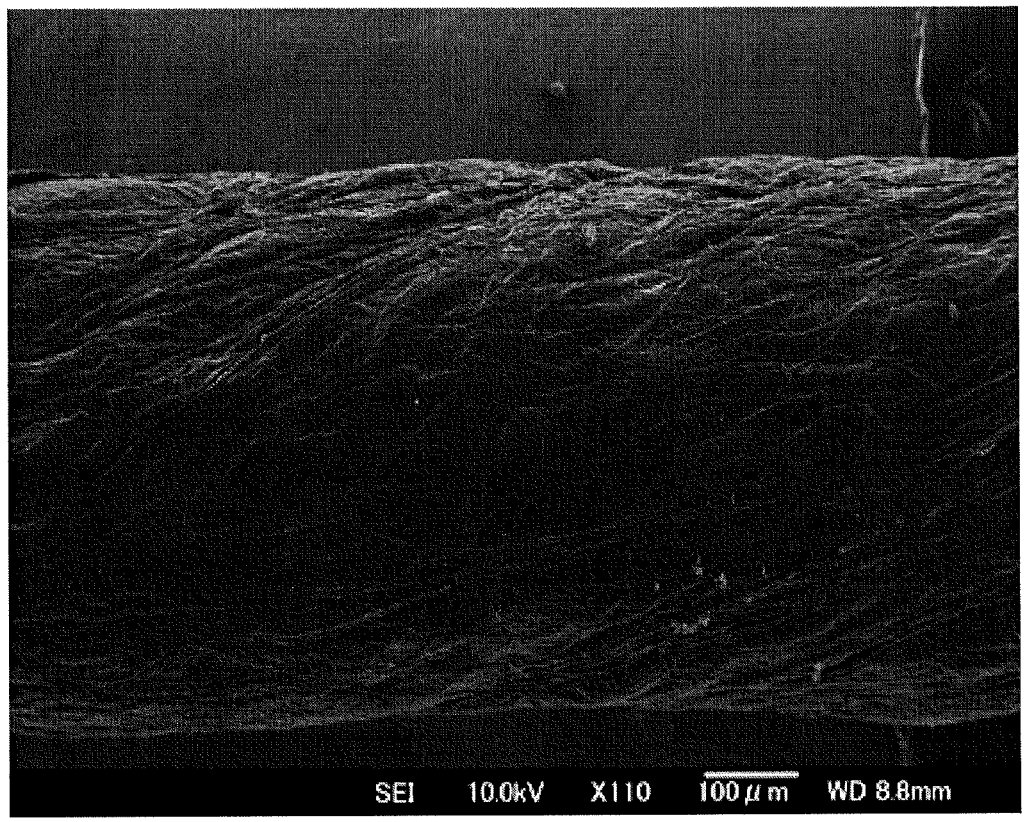
Figure 8C:
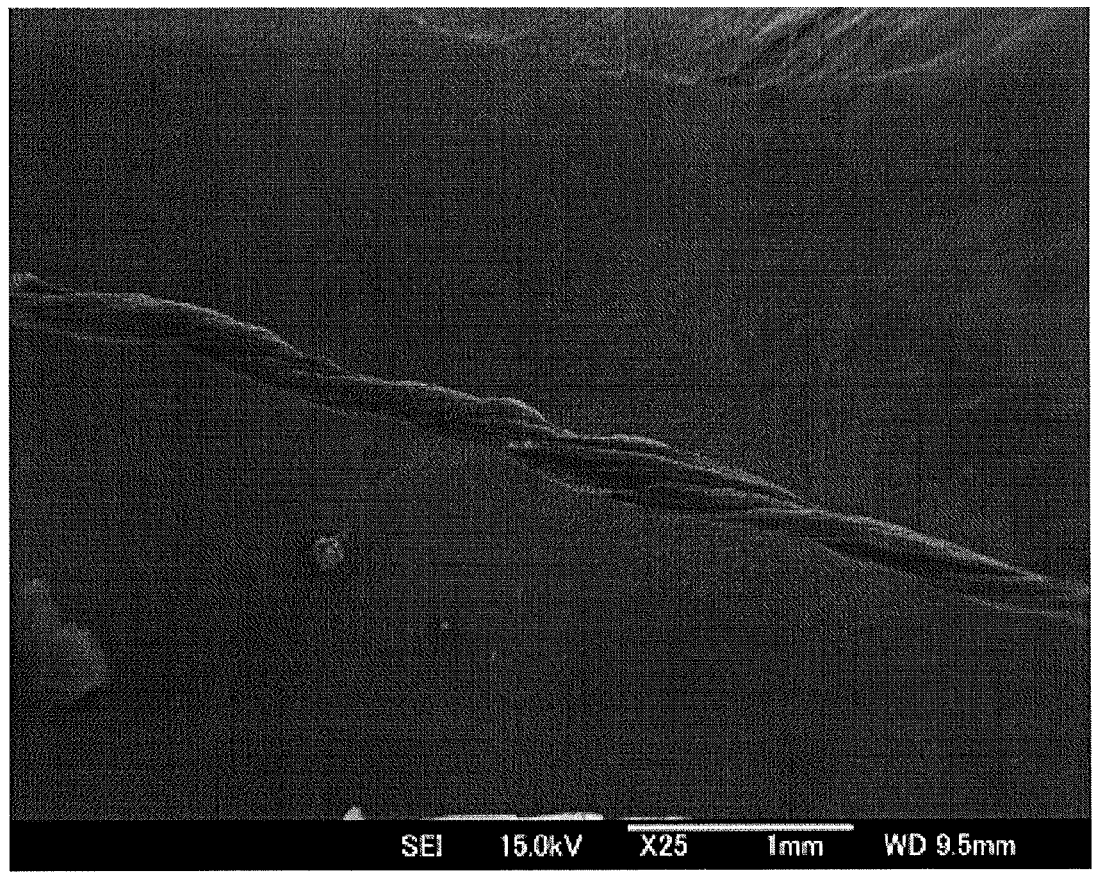
Figure 8D:
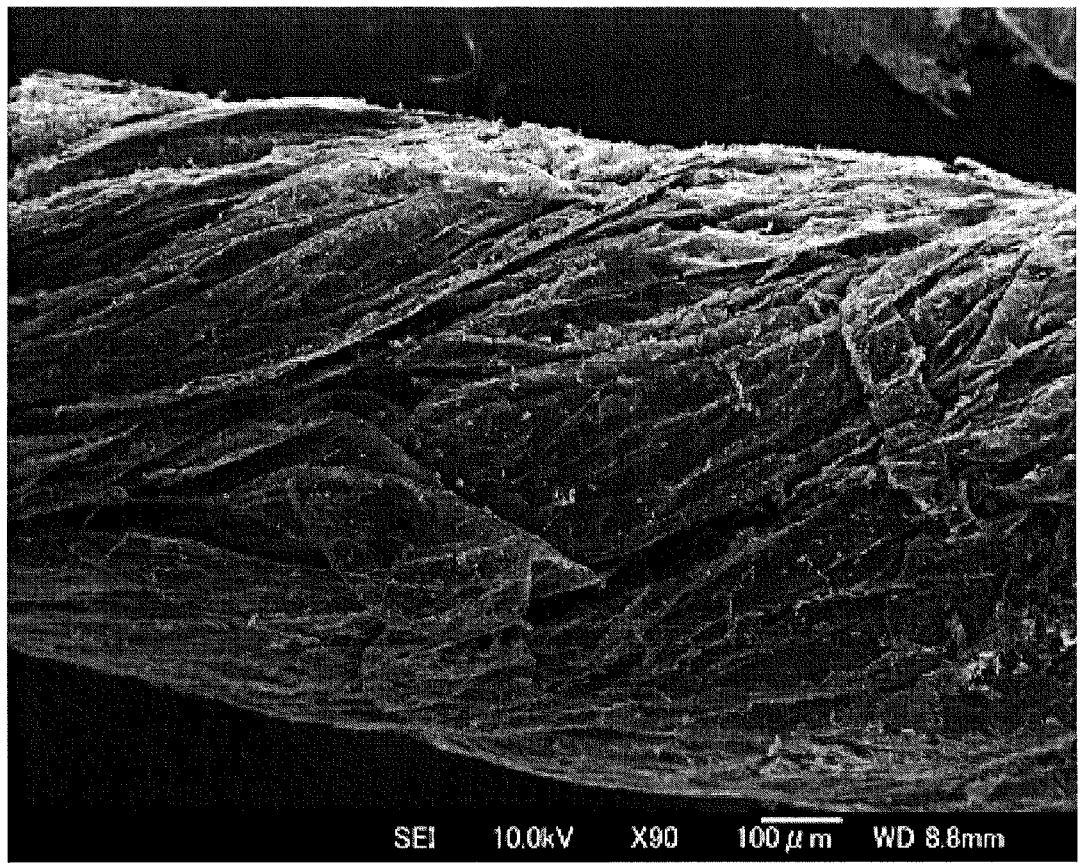

A graphene oxide fiber was prepared following a similar procedure as the indicated in Example 3. The resulting fiber of about 300 μm in diameter was treated sequentially at 80, 100, 120, 140, 160 and 180° C. for 24 h each stage. A resulting fiber is shown in FIG. 8A. Then, the temperature was increased from 180° C. to 300° C. at 20° C. increments each 20 min. and left at 300° C. for 1 h. A resulting fiber is shown in FIG. 8B. The fiber was further heated 30 min at 1050° C. resulting in the fiber in FIG. 8C, or heated by joule-heating for 10 min resulting in the fiber shown in FIG. 8D.

EXAMPLE 9

Weaves of Graphene Oxide Fibers

Figure 9:
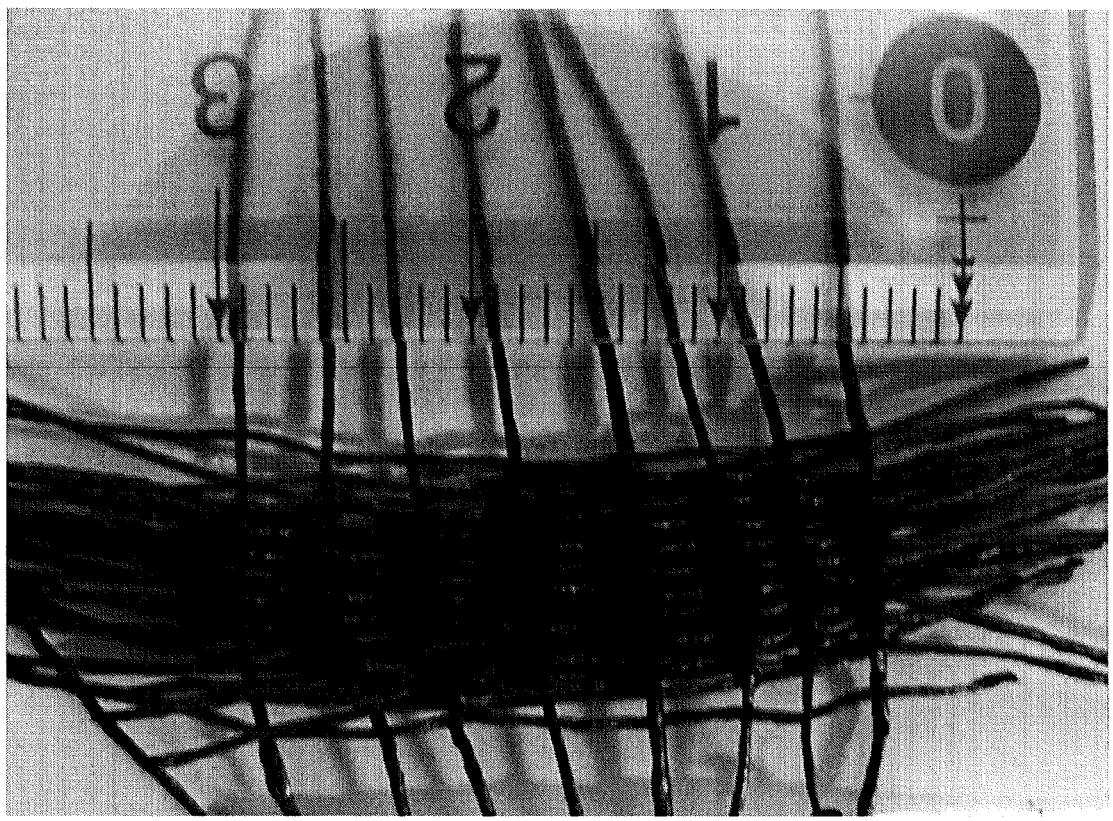
FIG. 9 is a picture of a woven fabric made of composite graphene oxide fibers.

Several graphene oxide fibers prepared by a method similar to Example 3, with fiber diameter of ca. 500 mm, were woven manually into plain weave. The resulting GO fabric is shown in FIG. 9. This weave may have applications in reinforced composites.

EXAMPLE 10

Application of an Electrically Conductive Graphene Fiber as Field Emitter

Figure 11:
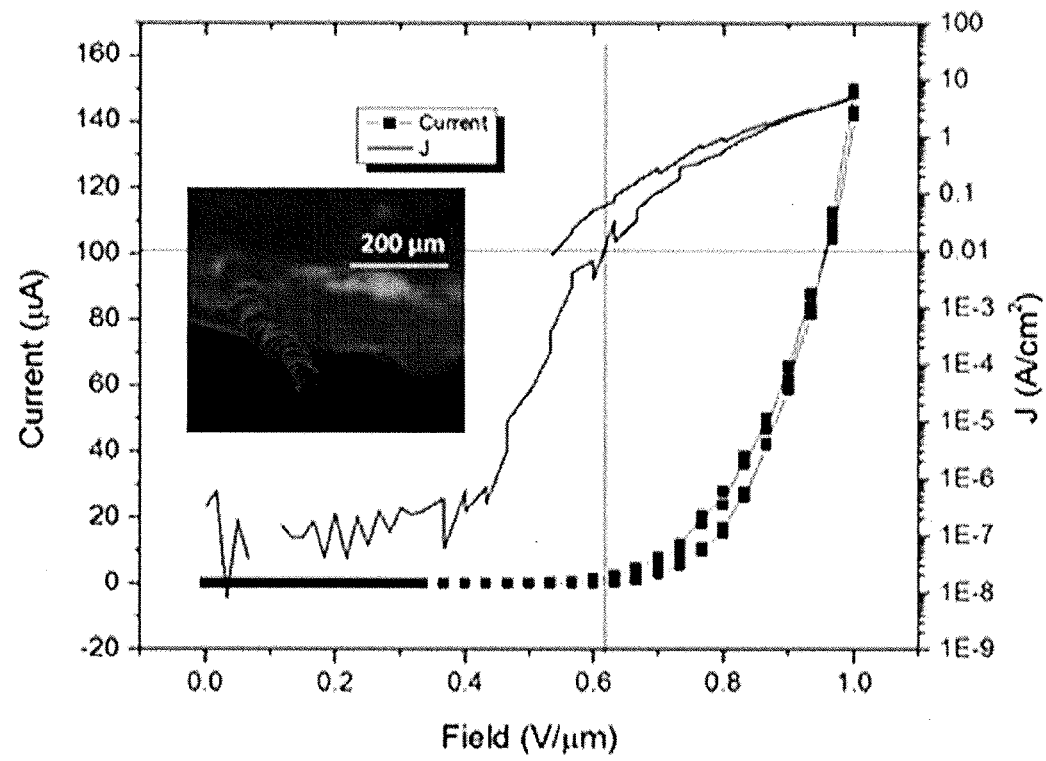
FIG. 11 is an application of an electrically conductive graphene fiber as field emitter. The inset shows the fiber used as field emitter while the plot shows its performance.

A graphene oxide fiber was prepared following a similar procedure as the indicated in Example 3. The resulting fiber was treated sequentially at 80, 100, 120, 140, 160 and 180° C. for 24 h each stage. Then, the temperature was increased from 180° C. to 300° C. at 20° C. increments each 20 min. and left at 300° C. for 1 h. Then, the fiber was annealed for 30 min under Ar atmosphere at 2000° C. The fiber was mounted on a cathode and introduced in a high vacuum chamber adapted to measure field emission. We tested the rGO fibers treated at 2000° C. for field emission application. Its I-E and electron-emission current density (J) curves are shown in FIG. 11. The graphene showed a turn-on field of 0.48 V/μm at current density of 10 μA/cm$^2$.

EXAMPLE 11

A graphene oxide slurry with solid content of 0.12% wt. was cast on top of a poly(vinylidenefluoride) nonwoven which was previously made by electrospinning. After drying the film was stored inside a petri dish and reduced 2 h at 80° C. in presence of 200 µL of hydrazine. Then it was cut and supported on paper filter (5 C) and used to filter a melamine nanoparticle aqueous slurry (0.01% wt. and 250 nm average diameter) under a pressure of 0.4 MPa in a laboratory-made dead-end filtration set-up. The permeate was analyzed under optical microscopy in dark field mode. No nanoparticles were detected in the permeate indicating the application of the inventive method to produce reduced graphene oxide supported films creates those that can be used as filters.

The invention claimed is:

1. A method for preparing a graphene oxide fiber, comprising:
    a) preparing a graphene oxide film by:
        preparing a graphene oxide gel slurry by concentration of a graphite oxide aqueous slurry:
        depositing the graphene oxide slurry on a low friction surface;
        spreading the graphene oxide slurry on the low-friction surface by bar coating; and
        drying the graphene oxide slurry, thereby preparing graphene oxide film;
    b) cutting the graphene oxide film into strips; and
    c) dry-spinning the graphene oxide film strips into a fiber.

2. The method of claim 1, wherein the diameter of the fiber is between 40 µm to 2500 µm.

3. A method for preparing a reduced graphene oxide fiber, comprising:
    a) preparing a graphene oxide fiber according to the method of claim 1; and
    b) reducing the graphene oxide fiber by at least one of thermal reduction and chemical reduction.

4. The method of claim 3, wherein the graphene oxide fiber is reduced by chemical reduction, and wherein the chemical reduction is accomplished by a chemical reducing agent selected from the group consisting of hydrazine, sodium borohydride, hydroiodic acid (IA), ascorbic acid, and cysteamine.

5. The method of claim 3, wherein the graphene oxide fiber is reduced by thermal reduction, said thermal reduction occurring at temperatures between 180 °C. and 3000°C.

6. The method of claim 3, further comprising treating the graphene oxide fiber by a combination of heat treatment, followed by joule heating under inert or reducing atmosphere in which the conductivity reached range from 0.0001 Ωcm to 400 Ωcm.

7. A method for preparing a graphene oxide weave, comprising:
    preparing a plurality of graphene oxide fibers by:
        preparing a graphene oxide gel slurry by concentration of a graphite oxide aqueous slurry;
        depositing the graphene oxide slurry on a low friction surface;
        spreading the graphene oxide slurry on the low-friction surface by bar coating;
        drying the graphere oxide slurry, thereby preparing graphene oxide film; and
        applying a second layer to the graphene oxide film, wherein the second layer is selected from the group consisting of carbon nanotubes, grapheme nanoplatelets,
    molybdenum disulfide, tungsten disulfide, polymer nanofiber, carbon fibers, and metallic nanowires; and
    weaving the graphene oxide fibers to form a graphene oxide weave.

* * * * *